(12) United States Patent
Beardmore

(10) Patent No.: US 6,609,987 B1
(45) Date of Patent: Aug. 26, 2003

(54) HYDRAULIC TIMING CHAIN TENSIONER ASSEMBLY

(75) Inventor: John Meade Beardmore, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/967,723

(22) Filed: Oct. 1, 2001

(51) Int. Cl.[7] .................................................. F16H 7/08
(52) U.S. Cl. ........................................ 474/111; 474/140
(58) Field of Search ................................. 474/101, 109, 474/110, 111, 140

(56) References Cited

U.S. PATENT DOCUMENTS

| | | | |
|---|---|---|---|
| 5,713,809 A | * 2/1998 | Yamamoto et al. | 474/110 |
| 5,833,220 A | 11/1998 | Nakakubo et al. | 267/226 |
| 5,879,255 A | * 3/1999 | Yamamoto et al. | 474/110 |
| 5,879,256 A | * 3/1999 | Tada | 474/110 |
| 6,045,471 A | 4/2000 | Suzuki | 474/109 |
| 6,203,461 B1 | 3/2001 | Watanabe et al. | 474/110 |
| 6,361,458 B1 | * 3/2002 | Smith | 474/109 |
| 6,383,103 B1 | * 5/2002 | Fujimoto et al. | 474/110 |
| 6,398,682 B1 | * 6/2002 | Suzuki et al. | 474/110 |
| 2001/0006917 A1 | * 7/2001 | Hashimoto | 474/110 |

* cited by examiner

*Primary Examiner*—Thomas R. Hannon
*Assistant Examiner*—Vicky A. Johnson
(74) *Attorney, Agent, or Firm*—Leslie C. Hodges

(57) ABSTRACT

A hydraulic timing chain tensioner assembly includes a shoe configured to contact a timing chain, and a plunger having a distal end abutting the shoe. The plunger is movable within a cylindrical opening formed in a tensioner body. The cylindrical opening includes oil and a spring member therein to cushion chain loads transmitted through the shoe and plunger. A spring-controlled oil pressure relief structure is operatively associated with the cylindrical opening to vent the oil when the oil is pressurized above a predetermined level by the plunger, thereby enabling further movement of the plunger into the cylindrical opening to reduce maximum loads experienced by the timing chain.

8 Claims, 2 Drawing Sheets

HYDRAULIC TIMING CHAIN TENSIONER ASSEMBLY

TECHNICAL FIELD

The present invention relates to a hydraulic timing chain tensioner assembly including a spring-controlled oil pressure relief structure configured to vent highly pressurized oil to reduce maximum loads experienced by the timing chain.

BACKGROUND OF THE INVENTION

FIG. 1 shows a typical prior art chain-driven dual overhead cam layout, including a timing chain 10 which is driven by a crankshaft 12 to rotate intake and exhaust cam shafts 14, 16, respectively. The chain 10 is guided by guide assemblies 18, 20, and a chain tensioner assembly 22 is provided for properly tensioning the chain 10. The chain tensioner assembly 22 includes a shoe (or lever) 24 which is pivotable about a fixed pivot point 26, and includes a contact feature (or button) 28. The hydraulic tensioner 30 pushes against the contact feature 28 to tension the chain 10 and to cushion loads of the chain 10 which are applied through the shoe 24.

A typical hydraulic tensioner includes a spring-loaded piston which bears against the contact feature 28 on the pivoting shoe 24. Engine oil pressure is fed through a one-way ball check valve which applies a pressure-dependent load to the piston and shoe. The tensioner also includes a coarse-stepped ratchet device to prevent total collapse of the tensioner in the absence of oil pressure.

Under certain circumstances, the chain may experience undesirably high loads as a result of the ratchet assembly in the above-described hydraulic tensioner 30. For example, in the event of a cold start of the engine, maximum oil pressure exists, so the piston extends as far as the chain linkage will allow it. The engine then heats up and the ratcheted piston must retract as the chain becomes taut due to engine block thermal expansion. However, the ratchet may then bottom out and limit back-travel of the piston. When the piston bottoms out against the ratchet, the chain may experience extremely high loads which can compromise performance and durability of the chain and increase cam drive noise.

It is therefore desirable to provide an improved hydraulic timing chain tensioner assembly in which maximum loads experienced by the chain are regulated to desirable levels.

SUMMARY OF THE INVENTION

The present invention overcomes the above-referenced shortcomings of prior art hydraulic tensioners by providing a hydraulic tensioner which includes a spring-controlled oil pressure relief structure which is operative to vent oil from the tensioner when the oil is pressurized above a predetermined level, thereby reducing maximum loads experienced by the timing chain.

More specifically, the invention provides a hydraulic timing chain tensioner assembly including a shoe configured to contact a timing chain. A hydraulic tensioner includes a plunger with a distal end abutting the shoe. The plunger is movable within an opening formed in a tensioner body. The opening includes oil and a spring member therein to cushion chain loads transmitted through the shoe and plunger. A spring-controlled oil pressure relief structure is operatively associated with the opening to vent the oil when the oil is pressurized above a predetermined level by movement of the plunger as a result of loads transmitted from the chain, thereby enabling further movement of the plunger into the opening to reduce maximum loads experienced by the timing chain.

In one embodiment, the oil pressure relief structure is a pressure relief valve in fluid communication with the opening for selectively venting the oil. The pressure relief valve includes a ball spring-loaded toward a valve seat, such that the predetermined level of oil pressure causes movement of the ball away from the seat against the spring load to open the valve and vent the pressurized oil.

In another embodiment, the oil pressure relief structure is a poppet valve structure formed by the plunger. The plunger includes a plunger sleeve, a shoe contact end, a valve head end and an internal spring compressed between the shoe contact end and a rim of the plunger sleeve. The rim is also in contact with the oil and the valve head end to define a poppet valve. The poppet valve opens when force from pressure of the oil and force from the spring member against the rim overcome force of the internal spring against the rim.

Accordingly, an object of the present invention is to provide an improved hydraulic timing chain tensioner in which maximum loads experienced by the timing chain are regulated.

Another object of the invention is to provide an improved to hydraulic tensioner having a plunger movable against an oil chamber to pressurize the oil, wherein the tensioner includes a spring-controlled oil pressure relief structure which selectively releases highly pressurized oil from the oil chamber to allow further plunger movement and reduce maximum loads on the timing chain.

The above objects and other objects, features and advantages of the present invention are readily apparent from the following detailed description of the best modes for carrying out the invention when taken in connection with the accompanying drawings.

DESCRIPTION OF THE PREFERRED EMBODIMENT

Figure 1:
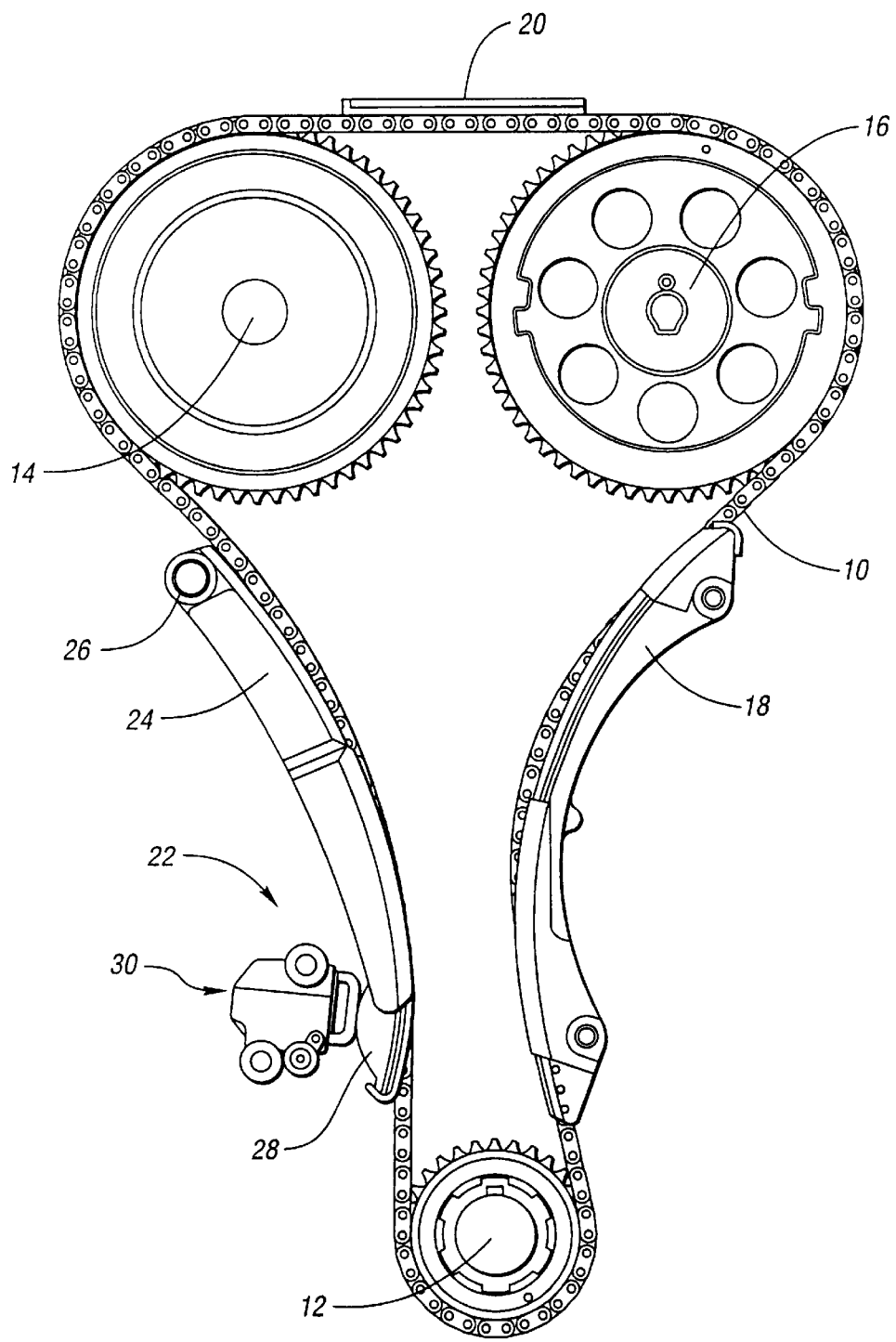
FIG. 1 shows a plan view of a prior art timing chain layout.
Figure 2:
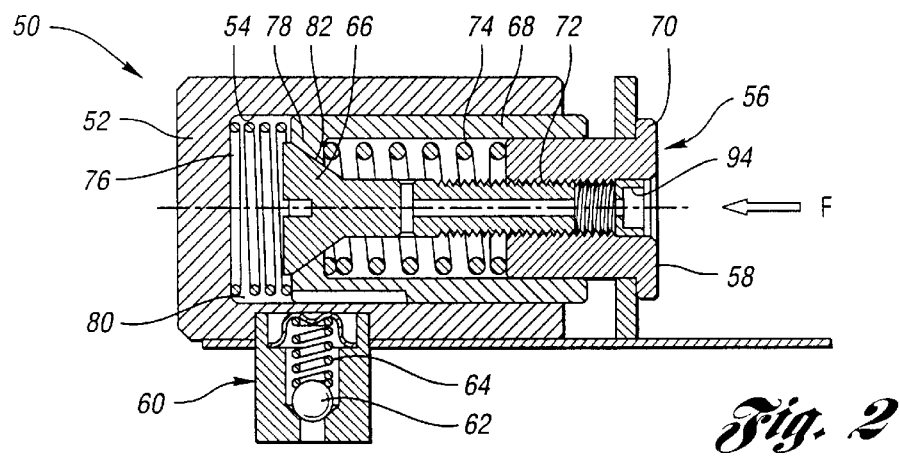
FIG. 2 shows a schematic cross-sectional view of a hydraulic timing chain tensioner in accordance with a first embodiment of the invention, wherein the valve is closed.
Figure 3:
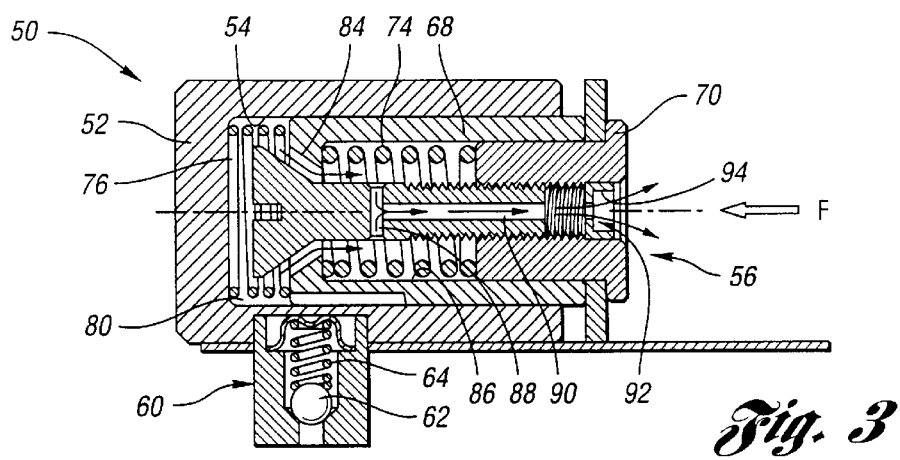
FIG. 3 shows a schematic cross-sectional view of the hydraulic timing chain tensioner of FIG. 2, wherein the valve is open.

Referring to FIGS. 2 and 3, a hydraulic chain tensioner is shown schematically in accordance with a first embodiment of the invention. As shown, the hydraulic tensioner 50 includes a tensioner body 52 having a cylindrical opening 54 formed therein to receive a movable plunger 56. The plunger 56 has a distal end 58 configured to contact a shoe, such as the shoe 24 shown in FIG. 1. The distal end 58 receives a force F from the shoe 24 as a result of tension in the timing chain.

The tensioner body 52 includes an inlet check valve 60, including a check valve ball 62 and spring 64, which allows one-way flow of oil into the cylindrical opening (or chamber) 54 of the tensioner body 52.

The plunger 56 includes a valve head portion 66 which is positioned within a plunger sleeve 68, and threadedly engaged with a shoe contact end 70 of the plunger via the threads 72. Alternatively, the threads 72 may be replaced by a stepped diameter and press-fit relationship. The plunger 56, including its valve head portion 66, plunger sleeve 68, shoe contact end 70, and internal spring 74, is movable within the cylindrical opening 54 as a result of forces (F) applied against the distal end 58 by the shoe and chain.

As viewed in FIGS. 2 and 3, leftward movement of the plunger 56 (including components 66, 68, 70, 74) is resisted or cushioned by force of the spring member 76 against the rim 78 of the sleeve 68, and by force from pressure of the compressed oil 80 against the valve head portion 66 and rim 78.

The various components of the plunger 56 cooperate to form a spring-controlled oil pressure relief structure operatively associated with the cylindrical opening 54 to vent the oil 80 when the oil 80 is pressurized above a predetermined level by the movement of the plunger 56, thereby enabling further leftward movement of the plunger 56, as viewed in FIGS. 2 and 3, into the cylindrical opening 54 to regulate loads experienced by the timing chain.

The oil pressure relief structure formed by the plunger components comprises a poppet valve structure formed by the plunger. The internal spring 74 of the plunger 56 is compressed between the shoe contact end 70 and the rim 78 of the sleeve 68. A poppet valve opening is selectively formed at the juncture between the rim 78 of the plunger 68 and the angled surface 82 of the valve head portion 66.

The spring 74 may be compressed to a desired load as a result of adjustment of the shoe contact end 70 with respect to the valve head portion 66 via adjustment of the threaded engagement 72. Adjustment of compression of the internal spring 74 will provide a predetermined pressure level of the oil 80 at which the valve will open. The valve will open when forces acting toward the right (as viewed in FIG. 2) against the rim 78 of the sleeve 68 as a result of pressure of the oil 80 and force from the spring 76 overcome the force of the internal spring 74 acting toward the left (as viewed in FIG. 2).

As illustrated in FIG. 3, when the force of the internal spring 74 against the rim 78 is overcome by the force of the spring 76 and the force of oil pressure 80 against the rim 78, the valve opens to form a valve opening 84 so that when the oil 80 is highly pressurized by force of the chain and shoe against the plunger 56, at the predetermined level of oil pressure, the internal spring 74 becomes further compressed which allows the sleeve to move away from the valve head portion 66, and the valve opens so that the oil may travel through the valve opening 84 into a spill chamber 86. From the spill chamber, the oil 80 travels through the passages 88, 90, and through the relief opening 92, which is formed in a cap plug 94 positioned within the shoe contact end 70 of the plunger 56. The relief opening 92 acts as a control orifice to control venting of the oil 80 therethrough.

Accordingly, when the load of the pivoting shoe against the distal end 58 of the plunger exceeds the preload of the internal spring 74, the valve opens and at least some of the oil 80 in the cylindrical opening 54 is vented as the rim 78 of the sleeve 68 unseats from the angled surface 82 of the valve head portion 66 of the plunger 56. The relieved oil goes through the passages 88, 90 and is controlled by the control orifice 92. The size of the relief opening 92 can be tuned to provide system dampening.

The oil vented through the control orifice 92 could be directed as desired to provide chain lubrication, or elsewhere.

Very tight clearances are provided between the sleeve 68 and the body 52, and between the shoe contact end 70 and the sleeve 68. These clearances are approximately 0.000040 inches (1 μm) maximum. The sealing between chambers depends on having these tight clearances and also allows the control orifice 92 to do most of the system damping. An orifice size of 0.020–0.030 inches (0.5–0.75 mm) in diameter has been found to be adequate for the control orifice 92 in a prototype evaluation. The distance that the valve opens relative to the seat is adjustable to tailor overall regulation characteristics if needed. A distance of 0.010 inch (0.25 mm) was used in the prototype evaluation.

This device may also employ a conventional indexing or ratcheting device if necessary.

Figure 4:
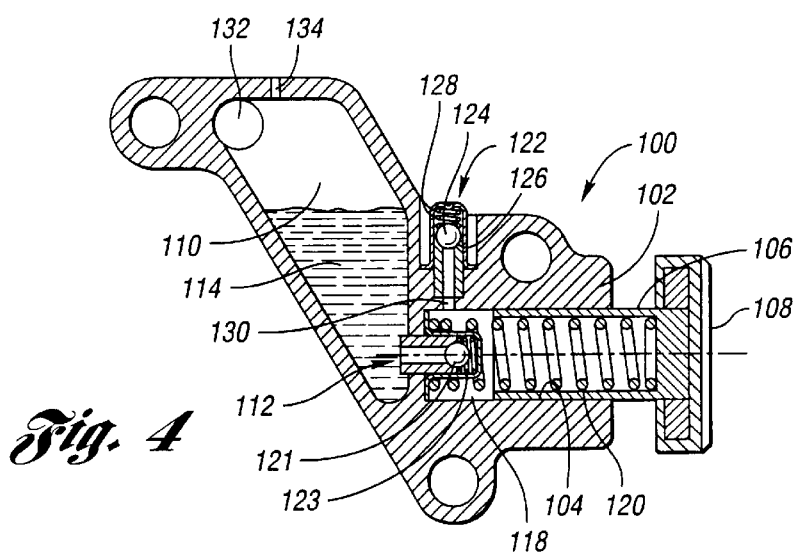
FIG. 4 shows a schematic cross-sectional view of a hydraulic timing chain tensioner in accordance with an alternative embodiment of the invention.

Turning to FIG. 4, an alternative embodiment of the invention is shown. In this embodiment, the hydraulic timing chain tensioner 100 includes a tensioner body 102 having a cylindrical opening 104 formed therein to receive a movable plunger 106. The movable plunger 106 has a distal end 108 configured to contact a shoe, such as the shoe 24 shown in FIG. 1, for transmitting forces between the chain, shoe and tensioner 100.

The body 102 includes an integral reservoir 110, and an inlet check valve assembly 112 which selectively allows passage of the oil 114 into the chamber 118. The inlet check valve assembly 112 includes a ball 121 and spring 123. When force from pressurization of the oil 114 overcomes the force of the spring 123, the ball 121 unseats to allow passage of oil into the chamber 118. Forces against the distal end 108 of the plunger 106 ate reacted by forces from pressurization of the oil in the chamber 118 and compression forces of the spring 120.

The hydraulic timing chain tensioner 100 includes a spring-controlled oil relief structure 122 in the form of an outlet check valve assembly. The outlet check valve assembly includes a ball 124 biased against a valve seat 126 by a spring 128. The outlet check valve assembly is communicated with the chamber 118 via the orifice 130. Accordingly, when a predetermined load is applied against the distal end 108 of the plunger 106 in a leftward direction (as viewed in FIG. 4), the oil in the chamber 118 is highly pressurized, and communicated through the orifice 130 to the check valve assembly. When force from pressure of oil against the ball 124 overcomes the force of the spring 128, the ball 124 unseats from the valve seat 126, thereby allowing venting of this highly pressurized oil. In this manner, further movement of the plunger in the leftward direction as viewed in FIG. 4 is enabled to reduce maximum loads experienced by the timing chain. Also, the control orifice 130 may be sized to provide improved dynamic control.

The oil reservoir 110 provides a "head" of oil which is generally needed for engine start-ups until the lubrication system becomes fully pressurized in order to maintain proper tensioning and control of the cam drive. The reservoir 110 could be replaced with an internal "stand pipe" to serve the same function. As shown, the oil feed 132 from the selected engine oil gallery should enter the reservoir at the highest point to prevent drain-back after the engine has stopped. A purging orifice 134 is also placed near the top of the reservoir cavity to purge any air entrained within the oil. The size of this orifice should be on the order of 0.8–1.0 millimeters. Orientation of the orifice may be provided to lubricate critical areas of the cam drive if so desired.

Oil is drawn through the inlet check valve 112 whenever the plunger 106 extends outward to maintain contact with the chain shoe. This would occur in a "macro" sense, as slack develops in the chain span during normal operation, either through thermal changes or system wear. Plunger motion is also cyclical to a smaller degree as crank firing and cam torque pulses alternatively load and unload the timing chain. Should the internal plunger pressure be too great, excessive wear and high chain noise will result. Conversely, if the pressure is insufficient, then loss of chain control will occur. There is often a relatively narrow load window in which control of the cam drive is optimal. As described above, to alleviate excessive pressures (or loading of the drive chain), this concept incorporates the pressure relief valve 122 into the high pressure section of the tensioner. As shown, the pressure relief valve 122 is positioned on the tensioner 100 in a location to avoid air pockets. The check valve could also be located at the end of the plunger if necessary depending upon the overall angular position of the tensioner unit.

Calibration of the blow-off pressure of the relief valve 122 must be performed for a given application. In one test operation, a pressure range of 150–300 kPa was found suitable.

It is very important with this style of tensioner to have a leak-free plunger. This can be accomplished by maintaining the plunger-to-bore clearances to around 5 $\mu$m. Alternatively, low leakage can be provided with a seal, such as an O-ring seal, on the plunger.

The mechanical ratchet device of the prior art is not needed for engine start-ups with this invention. However, such a ratchet device could be incorporated with this invention.

While the best modes for carrying out the invention have been described in detail, those familiar with the art to which this invention relates will recognize various alternative designs and embodiments for practicing the invention within the scope of the appended claims.

What is claimed is:

1. A hydraulic timing chain tensioner assembly comprising:
    a shoe configured to contact a timing chain;
    a hydraulic tensioner including a plunger having a distal end abutting said shoe, said plunger being movable within an opening formed in a tensioner body, said opening including oil and a spring member therein to cushion chain loads transmitted through the shoe and plunger;
    said hydraulic tensioner further including a spring-controlled oil pressure relief structure operatively associated with said opening to vent the oil when the oil is pressurized above a predetermined level by movement of the plunger into the opening, thereby enabling further movement of the plunger into the opening to regulate loads experienced by the timing chain; and
    wherein said oil pressure relief structure comprises a poppet valve structure formed by the plunger, the plunger including a plunger sleeve, a shoe contact end, a valve head end and an internal spring compressed between the shoe contact end and a rim of said plunger sleeve, said rim also being in contact with the oil and with the valve head end for closing the poppet valve, said poppet valve opening when force from pressure of the oil and force from the spring member against the rim overcomes force of the internal spring against the rim.

2. The hydraulic timing chain tensioner of claim 1, wherein the spring member abuts the plunger sleeve.

3. The hydraulic timing chain tensioner of claim 1, wherein said valve head end is positioned on a shaft which is treaded into the shoe contact end, said plunger sleeve and shaft cooperating to form a spill chamber having a relief opening to vent oil spilling past the poppet valve when opened.

4. The hydraulic timing chain tensioner of claim 3, wherein the shaft includes a vent channel therethrough for communicating the spill chamber with the relief opening.

5. The hydraulic timing chain tensioner of claim 4, wherein said relief opening is formed by a cap plug positioned within the shoe contact end of the plunger, said cap plug having a control orifice therethrough.

6. The hydraulic timing chain tensioner of claim 3, wherein said valve head end forms an angled valve seat which cooperates with the rim of the sleeve to open and close the poppet valve.

7. The hydraulic timing chain tensioner of claim 1, wherein the shoe contact end is adjustable with respect to the valve head end for adjusting compression of the spring, thereby setting said predetermined level.

8. A hydraulic timing chain tensioner assembly comprising:
    a shoe configured to contact a timing chain;
    a hydraulic tensioner including a plunger having a distal end abutting said shoe, said plunger being movable within an opening formed in a tensioner body, said opening including oil and a spring member therein to cushion chain loads transmitted through the shoe and plunger; and
    said hydraulic tensioner further including a poppet valve structure formed by the plunger, the plunger including a plunger sleeve, a shoe contact end, a valve head end, and an internal spring compressed between the shoe contact end and a rim of said plunger sleeve, wherein the valve head end is connected to the shoe contact end and the plunger sleeve is movable with respect to the valve head end to create a valve opening between the valve head end and the rim when force from pressure of the oil and force from the spring member against the rim overcomes force of the internal spring against the rim to vent the pressurized oil to regulate loads experienced by the timing chain.

* * * * *